United States Patent [19]

Liao et al.

[11] Patent Number: 5,028,686

[45] Date of Patent: Jul. 2, 1991

[54] CONCURRENT ADDITION PROCESS FOR PREPARING HIGH PURITY EPOXY RESINS

[75] Inventors: Zeng-Kun Liao, Lake Jackson, Tex.; Chun S. Wang, Tainan, Taiwan

[73] Assignee: The Dow Chemical Company, Midland, Mich.

[21] Appl. No.: 584,954

[22] Filed: Sep. 18, 1990

Related U.S. Application Data

[63] Continuation-in-part of Ser. No. 423,817, Oct. 18, 1989, abandoned, which is a continuation-in-part of Ser. No. 283,400, Dec. 12, 1988, abandoned.

[51] Int. Cl.$^5$ ................. C08G 59/06; C08G 59/08
[52] U.S. Cl. .................... 528/92; 528/95; 528/366; 528/405; 525/507; 525/534; 549/514; 549/515; 549/517
[58] Field of Search .............. 528/92, 95; 525/507, 525/534; 549/517

[56] References Cited

U.S. PATENT DOCUMENTS

| | | | |
|---|---|---|---|
| 2,848,435 | 8/1958 | Griffin et al. | 528/95 |
| 4,499,255 | 2/1985 | Wang et al. | 528/95 |
| 4,778,863 | 10/1988 | Wang et al. | 528/95 |

Primary Examiner—Earl Nielsen
Assistant Examiner—Frederick Krass

[57] ABSTRACT

Epoxy resins which are relatively low in total bound halide are prepared by concurrently and continuously adding a mixture of (1) a mixture of an epihalohydrin, a compound containing an average of more than one group reactive with a vicinal epoxide group and a solvent and (2) an aqueous or organic solution of an alkali or alkaline earth metal hydroxide; to (3) a mixture of epihalohydrin and a solvent.

12 Claims, No Drawings

CONCURRENT ADDITION PROCESS FOR PREPARING HIGH PURITY EPOXY RESINS

CROSS-REFERENCE TO RELATED APPLICATIONS

This application is a continuation-in-part of application Ser. No. 07/423,817 filed Oct. 18, 1989 now abandoned which is a continuation-in-part of application Ser. No. 07/283,400 filed Dec. 12, 1988 now abandoned both of which are incorporated herein by reference in their entirety.

BACKGROUND OF THE INVENTION

The present invention relates to the preparation of high purity epoxy resins.

FIELD OF THE INVENTION

Epoxy resins, especially the o-cresol epoxy novolac resins are widely used for semiconductor device encapsulation in the microelectronic industry. The major criteria for measuring quality of these resins are the level of total bound halogen and the epoxide content. Both factors have a great influence on the reliability of an encapsulated semiconductor device. Bound halogen are those halogens which are attached to a carbon atom which carbon atom is not adjacent to a carbon atom which has a hydroxyl group attached thereto. The following formulas A, B and C illustrate hydrolyzable halide and bound halide. Formula A is illustrative of a hydrolyzable halide whereas formulas B and C are illustrative of bound halides.

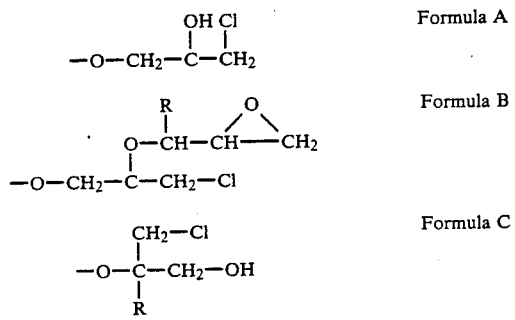

U.S. Pat. No. 4,499,255 to Wang et al. discloses that when suitable solvents such as 1-methoxy-2-hydroxy propane are used, epoxy resins low in hydrolyzable halide can be prepared by reacting an aromatic hydroxyl group containing compound with an epihalohydrin at a pressure sufficient to co-distill water with solvent at a temperature of from about 45° C. to about 80° C. in the presence of an alkali metal hydroxide solution. The total bound halogen content of the epoxy resins produced by this process is still at an unacceptable level for some applications such as in the encapsulation of semiconductor devices. Also, the solid o-cresol-formaldehyde novolac epoxy reins prepared by this process and processed in powder form will sinter, become stuck together, after standing at ambient temperature, abut 25° C., for one to two weeks. This makes these resins difficult to handle when they become sintered. Wang and Liao disclose in U.S. Pat. No. 4,785,061 a post treatment process for reducing the undesirable halide content of epoxy resins; however, the molecular weight distribution became broader after this post-treatment process which is considered to be undesirable by some semiconductor encapsulation formulators based on processing rheology. It would be desirable to be able to produce epoxy resins which are relatively low in bound halogen content and possess a relatively narrow molecular weight distribution for certain applications, such as the encapsulation of semiconductor devices.

SUMMARY OF THE INVENTION

The present invention pertains to an improvement in a process for preparing epoxy resins by reacting an epihalohydrin with one or more compounds having an average of more than one group reactive with a vicinal epoxide group per molecule in the presence of one or more solvents and an alkali or alkaline earth metal hydroxide or manganese hydroxide: wherein the improvement resides in adding, either concurrently and continuously or concurrently and intermittently, (1) a mixture of (a) epihalohydrin, (b) one or more compounds containing an average of more than one group reactive with a vicinal epoxide group and (c) one or more solvents; and (2) an organic or aqueous solution of one or more alkali or alkaline earth metal hydroxides or manganese hydroxide: to (3) a mixture containing epihalohydrin and one or more solvents.

Another aspect of the present invention pertains to an improvement in a process for preparing epoxy resins by reacting an epihalohydrin with one or more compounds having an average of more than one group reactive with a vicinal epoxide group per molecule in the presence of one or more solvents which codistil with water and epihalohydrin and an alkali or alkaline earth metal hydroxide or manganese hydroxide, continuously removing water from the reaction mixture as a codistillate with epihalohydrin and solvent at a rate such that the concentration of water in the reaction mixture is less than about 6% by weight, conducting the reaction under a reduced pressure sufficient to provide a codistillate containing water, epihalohydrin and solvent, separating the water from the codistillate and returning the solvent and epihalohydrin to the reaction mixture; wherein the improvement comprises adding, either concurrently and continuously or concurrently and intermittently, (1) a mixture of (a) epihalohydrin, (b) one or more compounds having an average of more than one group reactive with a vicinal epoxide group and (c) one or more solvents: and (2) a mixture of (d) one or more alkali or alkaline earth metal hydroxides or manganese hydroxide and (e) water or an organic solvent; to (3) a mixture containing (f) epihalohydrin and (g) one or more solvents.

The present invention provides a method for the production of epoxy resins which are relatively low in bound halogen content and which possess a relatively narrow molecular weight distribution. The o-cresol-formaldehyde epoxy novolac resins prepared by this process do not sinter upon standing at ambient temperature (25° C.) for more than two weeks.

DETAILED DESCRIPTION OF THE INVENTION

In carrying out the process of the present invention, a first component, herein referred to as mixture (1) comprising (a) epihalohydrin, (b) one or more compounds containing an average of more than one group reactive with a vicinal epoxide group and (c) one or more solvents and a second component, herein referred to as mixture (2), comprising (d) one or more alkali or alkaline earth metal hydroxides or manganese hydroxide and (e) water or an organic solvent are added either (i) concurrently and continuously or (ii) concurrently and intermittently to a third component herein referred to as mixture (3), containing (f) epihalohydrin and (g) one or more solvents.

In a preferred embodiment, mixture (3) contains, in addition to (f) epihalohydrin and (g) one or more solvents, (h) one or more compounds containing an average of more than one group reactive with a vicinal epoxide group in an amount up to about 15, preferably up to about 10, more preferably from about 1 to about 5 weight percent based upon the total amount of compounds having an average of more than one group reactive with a vicinal epoxide group to be employed in the reaction. The one or more compounds containing an average of more than one group reactive with a vicinal epoxide group (h) can be added directly to the mixture (3) or the mixture (1) which is added concurrently with mixture (2) to the mixture (3) can be started prior to the addition of mixture (2) and continued until such time as the mixture (3) contains the desired amount of compounds having an average of more than one group reactive with a vicinal epoxide group and then the mixture (2) is started to achieve concurrent addition of streams (1) and (2).

Regardless of which method of addition, (i) or (ii), is employed herein, it is preferred that addition of mixture (1) be completed before completion of the addition of mixture (2). In this preferred method, the addition of mixture (1) is usually completed in from about 30 to about 95, preferably from about 40 to about 90, most preferably from about 50 to about 85, percent of the time required for the addition of mixture (2).

It is also preferred that upon completion of the addition of mixture (2), the mixture containing the alkali or alkaline earth metal or manganese hydroxide, that the reaction be continued until the amount of the compounds containing an average of more than one group reactive with a vicinal epoxide group in the reaction mixture is not greater than about 1 percent by weight, preferably not greater than about 0.2% by weight.

The amount of the compounds containing an average of more than one group reactive with a vicinal epoxide group in the reaction mixture can be determined by any of the known analytical methods such as by infrared (IR) or ultraviolet (UV) spectroscopy analysis.

The term "continuously" means that the components are added without interruption from the time the addition is started until the addition is completed.

The term "intermittently" means that the addition is interrupted and that there is a time interval of less than about 20, preferably less than about 10, most preferably less than about 5, minutes between interruptions in the concurrent addition of mixture (1) and mixture (2) to mixture (3).

The process of the present invention is conveniently conducted at a temperature suitably from about 20° C. to about 100° C., more suitably from about 30° C. to about 80° C., most suitably from about 40° C. to about 60° C.; at a pressure suitably from about 20 to about 760, more suitably from about 30 to about 400, most suitably form about 40 to about 200 mm Hg absolute: for a time sufficient to complete the reaction. Usually, the higher temperatures require shorter addition times whereas the lower temperatures require longer addition times. It is preferred that the time of addition for the mixture (2) is from about 1 to about 20 hours at a reaction temperature of from about 35° C. to about 80° C., more preferably from 2 to about 15 hours at a reaction temperature of from about 40° C. to about 70° C., more preferably from about 3 to about 10 hours at a reaction temperature of from about 45° C. to about 60° C.

At temperatures below about 20° C., the reaction proceeds very slowly.

At temperatures above about 100° C., a pressurized reactor is required.

At pressures below about 20 mm Hg absolute, low reaction temperatures result which results in extended reaction times.

At pressures above about 760 mm Hg absolute, a pressurized reactor is required.

The epihalohydrin and the compound having groups reactive with a vicinal epoxide group are employed in amounts which provide a ratio of moles of epihalohydrin per group reactive with an epoxide group suitably from about 1:1 to about 15:1, more suitably from about 1.5:1 to about 12:1, most suitably from about 1.5:1 to about 10:1.

At ratios below about 1:1, complete reaction of the reactive group with the epihalohydrin cannot be achieved.

At ratios above about 15:1, the productivity (capacity) of the reactor is reduced.

Suitable epihalohydrin compounds which can be employed herein include, for example, those compounds represented by the following formula I

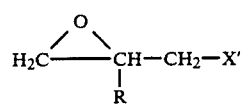

Formula I wherein R is hydrogen or a hydrocarbyl group containing from 1 to about 4 carbon atoms and X' is a halogen, preferably chlorine. Particularly suitable epihalohydrin compounds include, for example, epichlorohydrin, epibromohydrin, epiiodohydrin, methylepichlorohydrin, methylepibromohydrin, methylepiiodohydrin, mixtures thereof and the like.

Suitable compounds having an average of more than one group reactive with a vicinal epoxide group per molecule which can be employed herein include, for example but not limited to, those represented by the following formulas II-VII Formula II

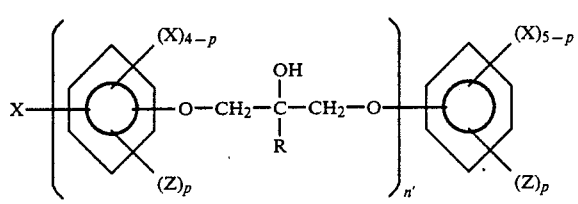

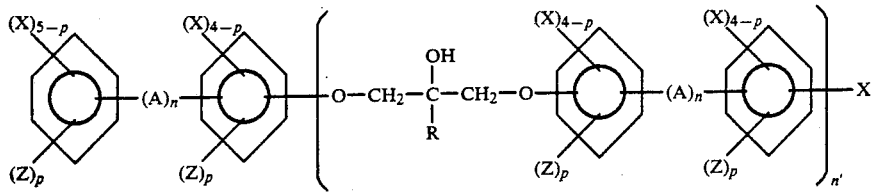

Formula III

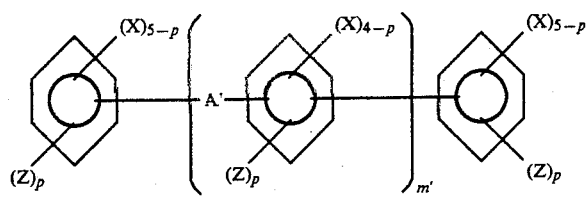

wherein each A is independently a divalent hydrocarbon group having suitably from 1 to about 20, more suitably from 1 to about 12, most suitably from 1 to about 6, carbon atoms, -S-, -S-S-, -O-, -SO-, -SO$_2$-, or -CO-; each A' is independently a divalent hydrocarbon group having from 1 to about 20, more suitably from 1 to about 12, most suitably from 1 to about 4, carbon atoms; Q is a trivalent aliphatic, cycloaliphatic, or aromatic hydrocarbon group having suitably from 1 to about 12, suitably from 1 to about 20, more suitably from 1 to about 10, most suitably from 1 to about 4, carbon atoms; each R is independently hydrogen or an alkyl group having from 1 to about 4 carbon atoms; each X is independently hydrogen, a hydrocarbyl or hydrocarbyloxy group having suitably from 1 to about 12, more suitably from 1 to about 6, most suitably from 1 to about 4, carbon atoms or a halogen atom, preferably chlorine or bromine; each Z is independently a hydroxyl, amino or carboxyl group; m has an average value suitably from

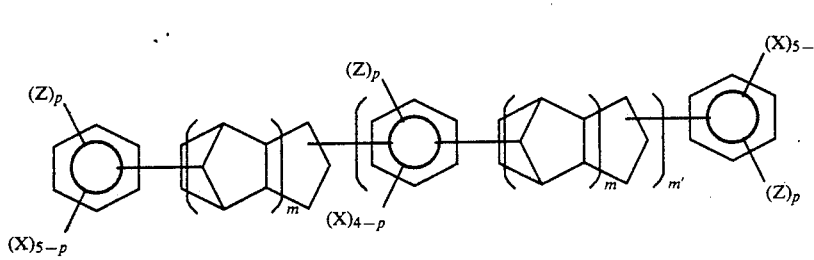

Formula V

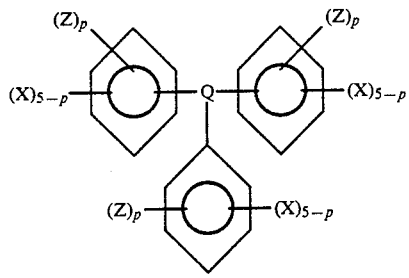

Formula VI

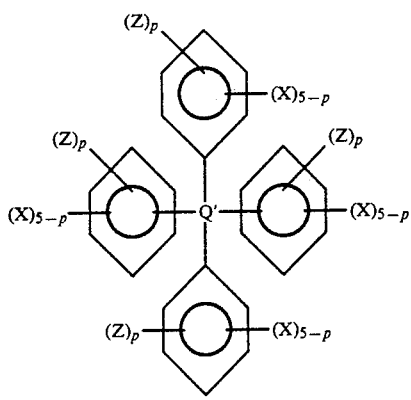

Formula VII more suitably from 1 to about 6, most suitably from 1 to about 4, carbon atoms; Q' is a tetravalent aliphatic, cycloaliphatic, or aromatic hydrocarbon group having about 1 to about 3, more suitably from about 1 to about 2; each m' has an average value suitably from about 1 to about 10, more suitably from about 1 to about 8, most suitably from about 1 to about 6; n has a value of zero or 1; n' has an average value suitably from zero to about 10, more suitably from zero to about 5, most suitably from zero to about 1; and p suitably has a value of 1 or 2.

The term "hydrocarbyl" as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term "hydrocarbyloxy" means a hydrocarbyl group having an oxygen linkage between it and the carbon atom to which it is attached.

Particularly suitable compounds containing an average of more than one group reactive with a vicinal epoxide group include, for example, resorcinol, catechol, hydroquinone, bisphenol A, bisphenol F, bisphenol K, bisphenol S, biphenol, 2,2',6,6'-tetramethylbiphenol, phenol formaldehyde novolac resins, cresol formaldehyde novolac resins, dicyclopentadiene phenol resins, dicyclopentadiene cresol resins, methylene dianiline, 2,2',4,4'-tetrahydroxybenzophenone, 1,1,2,2-tetrakis(2-hydroxyphenyl)ethane, tris-(phenol)-methine, 2,2',6,6'-tetramethyl-3,3',5,5'tetrabromobiphenol, 2,2',6,6'-tetramentyl-3,3'5-tribromobiphenol, combinations thereof and the like.

Suitable alkali or alkaline earth metal hydroxides which can be employed herein include, for example, sodium hydroxide, potassium hydroxide, lithium hydroxide, barium hydroxide, calcium hydroxide, magnesium hydroxide, combinations thereof and the like. Also suitable is manganese hydroxide either alone or in combination with the alkali or alkaline earth metal hydroxides.

The alkali or alkaline earth metal hydroxide can be employed in solution with water or an organic solvent such as alcohols, sulfoxides or amides, such as, for example, methanol, ethanol, isopropanol, dimethylsulfoxide, dimethylacetamide, or combinations thereof. Water is the preferred solvent for the alkali or alkaline earth metal hydroxide. The alkali or alkaline earth metal hydroxide solution is employed in a concentration suitably from 10 to about 70, more suitably from 20 to about 60, most suitably from 30 to about 50, percent alkali or alkaline earth metal hydroxide by weight.

The alkali or alkaline earth metal hydroxide or manganese hydroxide is employed in amounts which results in a ratio of moles of alkali or alkaline earth metal hydroxide or manganese hydroxide per group reactive with an epoxide group employed of from about 0.75:1 to about 1.25:1, preferably from about 0.9:1 to about 1.05:1.

At ratios of alkali or alkaline earth metal hydroxide or manganese hydroxide per group reactive with an epoxide group of less than about 0.75:1 results in products low in epoxide content due low conversions of the groups reactive with a vicinal epoxide.

At ratios of alkali or alkaline earth metal hydroxide or manganese hydroxide per group reactive with an epoxide group of greater than about 1.25:1 products low in epoxide content are produced due to hydrolysis of the epoxide groups by the alkali or alkaline earth metal or manganese hydroxides and products higher in bound halide content due to the hydrolysis of the epihalohydrin by the alkali or alkaline earth metal or manganese hydroxides.

Suitable solvents which can be employed herein include, for example, such solvents as ketones, aliphatic esters, linear cyclic ethers, primary, secondary and tertiary alcohols, glycol monoethers, glycol ether acetates, aromatic hydrocarbons, aliphatic hydrocarbon having from 6 to about 12 carbon atoms, combinations thereof and the like. Any of the aforementioned solvents can be employed so long as it does not react with the components of the reaction mixture and has a boiling point such that it is not totally removed during codistillation of the water, epihalohydrin and solvents. Particularly suitable such solvents employed herein include, 1-methoxy-2-hydroxy propane, 1-butoxy-2-hydroxy ethane, tert-amyl alcohol, tert-hexyl alcohol, 1-isobutoxy-2-hydroxy propane, 1-phenoxy-2-hydroxy propane, cyclohexanol, dioxane, 1,2-diethoxyethane, 2-methoxyethyl ether, ethylene glycol monomethyl ether acetate, ethyl acetate, isobutyl acetate, isoamyl acetate, methyl ethyl ketone, methyl isobutyl ketone, dimethyl sulfoxide, dimethyl acetamide, N-methylpyrrolidinone, dimethylformamide, dimethyl acetamide, dimethylsulfone, tetramethyl urea, hexamethyl phosphoramide, tetramethylenesulfolane, combinations thereof and the like.

The solvents are employed in amounts such that the amount of solvent (g) in the initial epihalohydrin-solvent mixture (3) is suitably from about 5 to about 80, more suitably from about 5 to about 50, most suitably from about 10 to about 40, percent solvent based upon the combined weight of solvent (g) plus epihalohydrin (f).

The amount of solvent (c) in mixture (1) is suitably from about 5 to about 80, more suitably from about 5 to about 50, most suitably from about 10 to about 40, percent by weight based upon the combined weight of solvent (c), compound having an average of more than one group reactive with an epoxide group (b) and epihalohydrin (a).

The amount of compound having an average of more than one group reactive with an epoxide group (b) in mixture (1) is suitably from about 5 to about 75, more suitably from about 10 to about 50, most suitably from about 10 to about 40, percent by weight based upon the combined weight of solvent (c), compound having an average of more than one group reactive with an epoxide group (b) and epihalohydrin (a).

The amount of epihalohydrin (a) in mixture (1) is suitably from about 10 to about 90, more suitably from about 20 to about 80, most suitably from about 30 to about 70, percent by weight based upon the combined weight of solvent (c), compound having an average of more than one group reactive with an epoxide group (b) and epihalohydrin (a).

The process of the present invention can employ, if desired, the procedures for removing the water produced in the reaction by the procedure described by Wang et al. in U.S. Pat. No. 4,499,255 or by Wang et al. in U.S. Pat. No. 4,778,863, so long as the required procedures of the present invention are employed Both of these patents are incorporated herein by reference in their entirety.

The following examples are illustrative of the invention, but are not to be construed as to limiting the scope thereof in any manner.

EXAMPLES 1–10

Into a 2-liter reaction vessel equipped with temperature and pressure control and indicating means, two separate addition funnels for concurrent addition of the solution of polyphenols (mixture 1) and the solution of caustic (mixture 2), are added epichlorohydrin and 1-methoxy-2-hydroxy propane (propylene glycol methyl ether) with or without a second co-solvent as indicated in Table I. Equipment used for condensing, separating water from co-distillate mixture of water, solvent and epichlorohydrin is installed. After stirring at room temperature and atmospheric pressure to thoroughly mix the contents, the temperature is raised to a temperature of about 35° C. to about 65° C. and the pressure is reduced in order to provide the co-distillate with a boiling point as indicated in Table 1. Prior to the concurrent addition of the polyphenol solution and the aqueous caustic solution, either: (a) addition of the polyphenol solution is started prior to the start of the addition of the aqueous caustic solution and continued until the epihalohydrin solvent mixture in the reactor contains about 5 percent by weight of the total amount of polyphenol to be reacted: or (b) 5 percent by weight of the polyphenol to be reacted is added directly to the reactor containing epichlorohydrin and solvent prior to the start of the concurrent addition of the polyphenol-containing stream and the aqueous caustic-containing stream. Method (a) is employed in Examples 1–7 and method (b) is employed in Examples 8–10. To the resultant solution are added concurrently and continuously the polyphenol solution and the aqueous alkali metal hydroxide solution separately over a period of time indicated in Table I. The distillate is condensed, thereby forming two distinct phases, an aqueous phase (top) and an organic epichlorohydrin-solvents phase (bottom). The bottom layer is continuously returned to the reaction vessel. After finishing the addition of the sodium hydroxide solution, the mixture is digested at the boiling point for about 20 to 30 minutes. The salt is then removed by filtration, the excess epichlorohydrin and solvents are removed by distillation under vacuum. The resulting epoxy resin is dissolved in a 50/50 by weight mixture of methyl ethyl ketone/toluene. This epoxy resin-solvent mixture is washed with water successively to remove any remaining salt and is subsequently distilled to provide the resultant glycidyl ether product. The reactants, reaction conditions and results are given in Table I.

EXAMPLE 11

The procedure of examples 1–10 is employed using method (b) for adding 5 percent by weight of the polyphenol to the reactor containing epichlorohydrin and solvent and water is not removed from the reactor during the reaction and the pressure employed is atmospheric. The reactants, reaction conditions and results are given in Table I.

COMPARATIVE EXPERIMENTS A–I

Into a 2-liter reaction vessel equipped with temperature and pressure control and indicating means, means for condensing and separating water from a co-distillate mixture of water, epichlorohydrin and solvents is added an aromatic hydroxyl containing compound, epichlorohydrin and solvent or dual solvents in the amounts indicated in Table I. After stirring at room temperature and atmospheric pressure to thoroughly mix the contents, the temperature is raised to a temperature of about 35° C. to about 50° C. and the pressure is reduced in order to provide the co-distillate with a boiling point as indicated in Table I. To the resultant solution is continuously added a 50 percent aqueous sodium hydroxide solution over a period of time as indicated in Table I. During the addition of the sodium hydroxide solution, the water is removed by co-distilling with epichlorohydrin and the solvents. The distillate is condensed, thereby forming two distinct phases, an aqueous phase (top) and an organic epichlorohydrin-solvents phase (bottom). The bottom layer is continuously returned to the reaction vessel. After finishing the addition of the sodium hydroxide solution, the mixture is digested at the boiling point for about 20 to 30 minutes.

COMPARATIVE EXPERIMENT J

The procedure for comparative experiments A–I is employed except that Water is not removed from the reaction mixture and the pressure employed is atmospheric. The reactants, reaction conditions and results are given in Table I. The salt is then removed by filtration, the excess epichlorohydrin and solvents are removed by distillation under vacuum. The resulting epoxy resin is dissolved in a 50/50 by weight mixture of methyl ethyl ketone/toluene. The epoxy resin-solvent mixture is washed with water successively to remove any remaining salt and is subsequently distilled to provide the resultant glycidyl ether product. The results are given in Table I.

TABLE I

| REACTANTS, CONDI-TIONS & RESULTS | EXAMPLE OR COMPARATIVE EXPERIMENT | | | | | | | |
|---|---|---|---|---|---|---|---|---|
| | 1 | A* | 2 | B* | 3 | C* | 4 | D* |
| o-Cresol-Form. Novolac Resin[1] | | | | | | | | |
| softening point, °C. | 95 | 95 | 104 | 104 | 104 | 104 | 104 | 104 |
| equivalent weight | 118 | 118 | 118 | 118 | 118 | 118 | 118 | 118 |
| weight in grams | 96 | 96 | 192 | 96 | 173 | 120 | 192 | 154 |
| NaOH, 50% aqueous solution weight in grams | 64 | 64 | 125 | 63 | 112 | 79 | 125 | 97 |
| Epichlorohydrin (epi) | | | | | | | | |
| total weight, grams | 740 | 740 | 888 | 444 | 1066 | 740 | 888 | 710 |
| in novolac solution | 240 | 0 | 311 | 0 | 373 | 0 | 311 | 0 |
| in reactor | 500 | 740 | 577 | 444 | 693 | 740 | 577 | 710 |
| epi/novolac (eq. ratio) | 10/1 | 10/1 | 6/1 | 6/1 | 8/1 | 8/1 | 6/1 | 6/1 |
| Solvent | | | | | | | | |
| total, grams | 398 | 398 | 478 | 239 | 574 | 399 | 478 | 382 |
| epi/solvent (wt. ratio) | 65/35 | 65/35 | 65/35 | 65/35 | 65/35 | 65/35 | 65/35 | 65/35 |
| PGME[2] (total) | 398 | 398 | 478 | 239 | 373 | 260 | 239 | 191 |
| in novolac solution | 129 | 0 | 167 | 0 | 131 | 0 | 84 | 0 |

TABLE I-continued

| | | | | | | | | |
|---|---|---|---|---|---|---|---|---|
| in reactor | 269 | 398 | 311 | 239 | 242 | 260 | 155 | 191 |
| DMSO[3] (total) | 0 | 0 | 0 | 0 | 201 | 139 | 239 | 191 |
| in novolac solution | 0 | 0 | 0 | 0 | 70 | 0 | 84 | 0 |
| in reactor | 0 | 0 | 0 | 0 | 131 | 139 | 155 | 191 |
| PGME[2]/DMSO[3] (wt. ratio) | 100/0 | 100/0 | 100/0 | 100/0 | 65/35 | 65/35 | 50/50 | 50/50 |
| Reaction conditions addition time, hrs. | | | | | | | | |
| novolac solution | 5.5 | 0 | 4 | 0 | 4 | 0 | 4.5 | 0 |
| NaOH solution | 8 | 8 | 5.5 | 5.5 | 5.5 | 5.5 | 5 | 5 |
| temperature, °C. | 40 | 40 | 50 | 50 | 50 | 50 | 50 | 50 |
| pressure, mm Hg | 40–45 | 40–45 | 78–90 | 78–90 | 70–80 | 70–80 | 65–70 | 65–70 |
| Results | | | | | | | | |
| epoxide % | 22.8 | 23.0 | 22.4 | 22.6 | 22.9 | 22.6 | 22.7 | 22.7 |
| hydrolyzable Cl, ppm | 29 | 129 | 69 | 95 | 86 | 22 | 58 | 47 |
| total Cl, ppm | 816 | 1037 | 891 | 1025 | 705 | 784 | 586 | 741 |
| bound Cl, ppm | 787 | 908 | 828 | 930 | 619 | 762 | 528 | 694 |
| Tendency to sinter | NS[4] | S[5] | NS[4] | S[5] | NS[4] | S[5] | NS[4] | S[5] |

| REACTANTS, CONDITIONS & RESULTS | EXAMPLE OR COMPARATIVE EXPERIMENT | | | | | |
|---|---|---|---|---|---|---|
| | 5 | E* | 6 | F* | 7 | G* |
| DCPD Hydrocarbon-Phenol Resin[6] | | | | | | |
| weight in grams | 211 | 211 | 0 | 0 | 0 | 0 |
| equivalent weight | 176 | 176 | 0 | 0 | 0 | 0 |
| Bisphenol A | | | | | | |
| weight in grams | 0 | 0 | 183 | 183 | 0 | 0 |
| equivalent weight | 0 | 0 | 114 | 114 | 0 | 0 |
| Trisphenol Methine | | | | | | |
| weight in grams | 0 | 0 | 0 | 0 | 156 | 195 |
| equivalent weight | 0 | 0 | 0 | 0 | 98 | 98 |
| NaOH, 50% aqueous solution weight in grams | 93 | 93 | 123 | 123 | 124 | 124 |
| Epichlorohydrin (Epi) | | | | | | |
| total weight, grams | 888 | 888 | 888 | 888 | 888 | 888 |
| in polyphenol solution, g | 311 | 0 | 311 | 0 | 311 | 0 |
| in reactor, g | 577 | 888 | 577 | 888 | 577 | 888 |
| epi/polyphenol (eq. ratio) | 8/1 | 8/1 | 6/1 | 6/1 | 6/1 | 6/1 |
| PGME[2] (total) | 380 | 380 | 380 | 380 | 380 | 380 |
| in Polyphenol solution | 133 | 0 | 133 | 0 | 133 | 0 |
| in reactor | 247 | 380 | 247 | 380 | 247 | 380 |
| epi/PGME[2] (wt. ratio) | 65/35 | 65/35 | 65/35 | 65/35 | 65/35 | 65/35 |
| Reaction conditions addition time, hrs. | | | | | | |
| polyphenol solution | 4 | 0 | 3.5 | 0 | 4 | 0 |
| caustic solution | 5.5 | 5.5 | 5 | 5 | 5.5 | 5.5 |
| temperature, °C. | 50 | 50 | 55 | 55 | 50 | 50 |
| pressure, mm Hg absolute | 70–85 | 70–85 | 85–105 | 85–105 | 70–85 | 70–85 |
| Results | | | | | | |
| epoxide % | 17.4 | 17.6 | 23.7 | 23.9 | 26.0 | 26.7 |
| hydrolyzable Cl, ppm | 58 | 54 | 100 | 984 | 86 | 119 |
| total Cl, ppm | 710 | 812 | 904 | 2018 | 1023 | 1271 |
| bound Cl, ppm | 658 | 758 | 804 | 1034 | 937 | 1152 |

| REACTANTS, CONDITIONS & RESULTS | EXAMPLE OR COMPARATIVE EXPERIMENT | | | | | |
|---|---|---|---|---|---|---|
| | 8 | H* | 9 | 10 | I* | 11 | J* |
| o-Cresol-Form. Novolac Resin[7] | | | | | | |
| softening point, °C. | 104 | 104 | — | — | — | — | — |
| equivalent weight | 118 | 118 | — | — | — | — | — |
| weight in grams, total | 192 | 96 | — | — | — | — | — |
| in reactor | 9.6 | 96 | — | — | — | — | — |
| in solution with epi. | 182.4 | 0 | — | — | — | — | — |
| Bisphenol A | | | | | | | |
| equivalent weight | — | — | 114 | 114 | 114 | 114 | 114 |
| weight in grams, total | — | — | 79.8 | 79.8 | 79.8 | 57.0 | 57.0 |
| in reactor | — | — | 4.0 | 4.0 | 79.8 | 3.0 | 57.0 |
| in solution with epi. | — | — | 75.8 | 75.8 | 0 | 54.0 | 0 |
| NaOH, 50% aqueous solution weight in grams | 124.5 | 63 | 56 | 56 | 56 | 44 | 44 |
| Epichlorohydrin (Epi) | | | | | | | |
| total weight, grams | 888 | 444 | 388 | 388 | 388 | 279 | 279 |
| in soln. with polyphenol, g | 444 | 0 | 136 | 136 | 0 | 112 | 0 |
| in reactor, g | 444 | 444 | 252 | 252 | 388 | 167 | 279 |
| epi/polyphenol (eq. ratio) | 6/1 | 6/1 | 6/1 | 6/1 | 6/1 | 6/1 | 6/1 |
| PGME[2] (total) | 478 | 239 | 167 | 167 | 167 | 119 | 119 |
| in Polyphenol solution | 239 | 0 | 58 | 58 | 0 | 48 | 0 |
| in reactor | 239 | 239 | 109 | 109 | 167 | 71 | 119 |
| epi/PGME[2] (wt. ratio) | 65/35 | 65/35 | 70/30 | 70/30 | 70/30 | 70/30 | 70/30 |

TABLE I-continued

| Reaction conditions addition time, hrs. | | | | | | | |
|---|---|---|---|---|---|---|---|
| polyphenol solution | 4.3 | 0 | 4.0 | 3.0 | 0 | 3.3 | 0 |
| caustic solution | 5.2 | 5.5 | 4.7 | 4.7 | 4.7 | 4.3 | 4.3 |
| temperature, °C. | 50 | 50 | 50 | 50 | 50 | 55 | 55 |
| pressure, mm Hg absolute | 85–90 | 85–90 | 85–100 | 85–100 | 85–100 | 760 | 760 |
| Results | | | | | | | |
| epoxide % | 22.17 | 22.6 | 23.44 | 23.76 | 24.23 | 23.62 | 24.40 |
| total Cl, ppm | 922 | 1025 | 902 | 1073 | 1263 | 1269 | 1823 |
| hydrolyzable Cl, ppm | 100 | 95 | 142 | 242 | 269 | 296 | 388 |
| bound Cl, ppm | 822 | 930 | 760 | 831 | 994 | 973 | 1435 |

*Not an example of the present invention
[1] o-Cresol-formaldehyde novolac resin having an average functionality of 5 to 6.
[2] Propylene glycol methyl ether.
[3] Dimethyl sulfoxide.
[4] Powdered product does not become sintered for more than two weeks at 25° C.
[5] Powdered product becomes sintered after one to two weeks at 25° C.
[4] Powdered product becomes sintered after one to two weeks at 25° C.
[6] Dicyclopentadiene-phenol resin having an average functionality of 3.
[7] o-Cresol-formaldehyde novolac resin having an average functionality of 5 to 6.

What is claimed is:

1. In a process for preparing epoxy resins by reacting an epihalohydrin with one or more compounds having an average of more than one group reactive with a vicinal epoxide group per molecule in the presence of one or more solvents and an alkali or alkaline earth metal hydroxide or manganese hydroxide; the improvement which comprises adding, either concurrently and continuously or concurrently and intermittently, (1) a mixture of (a) epihalohydrin, (b) one or more compounds having an average of more than one group reactive with a vicinal epoxide group and (c) one or more solvents: and (2) a mixture of (d) one or more alkali or alkaline earth metal hydroxides or manganese hydroxide and (e) water or an organic solvent: to (3) a mixture containing (f) epihalohydrin and (g) one or more solvents.

2. The process of claim 1 wherein
   (a) the concentration of the initial mixture (3) of epihalohydrin and solvent is from about 20 to about 95 percent by weight epihalohydrin based upon the combined weight of epihalohydrin and solvent:
   (b) the concentration of epihalohydrin in the mixture, (1), of epihalohydrin, one or more compounds having an average of more than one group reactive with a vicinal epoxide group and one or more solvents is from about 20 to about 90 percent by weight based upon the combined weight of the components in the mixture (1);
   (c) the concentration of compound(s) having an average of more than one group reactive with a vicinal epoxide group in the mixture, (1), of epihalohydrin, one or more compounds having an average of more than one group reactive with a vicinal epoxide group and one or more solvents is from about 5 to about 75 percent by weight based upon the combined weight of the components in the mixture, (1);
   (d) the concentration of solvent(s) in the mixture, (1), of epihalohydrin, one or more compounds having an average of more than one group reactive with a vicinal epoxide group and one or more solvents is from about 5 to about 80 percent by weight based upon the combined weight of the components in the mixture, (1);
   (e) mixture (2) is an organic or aqueous solution of an alkali or alkaline earth metal hydroxide and the concentration of alkali metal or alkaline earth metal hydroxide in the water or organic solvent is from about 30 to about 60 percent by weight based upon the combined weight of the components in the mixture, (2);
   (f) mixtures (1) and (2) are added concurrently and continuously to mixture (3);
   (g) the addition of mixture (1) is completed prior to completion of the addition of mixture (2);
   (h) the addition time of mixture (2) is from about 1 to about 20 hours at a temperature of from about 35° C. to about 80° C.; and
   (i) the mixture (3) additionally contains one or more compounds having an average of more than one group reactive with a vicinal epoxide group in an amount up to about 15 percent by weight of the total amount of compounds having an average of more than one group reactive with a vicinal epoxide group to be employed in the reaction prior to the simultaneous addition of mixtures (1) and (2) to mixture (3).

3. The process of claim 1 wherein
   (a) the concentration of the initial mixture, (3), of epihalohydrin and solvent is from about 50 to about 90 percent by weight epihalohydrin based upon the combined weight of epihalohydrin and solvent;
   (b) the concentration of epihalohydrin in the mixture, (1), of epihalohydrin, one or more compounds having an average of more than one group reactive with a vicinal epoxide group and one or more solvents is from about 40 to about 90 percent by weight based upon the combined weight of the components in the mixture;
   (c) the concentration of compound(s) having an average of more than one group reactive with a vicinal epoxide group in the mixture, (1), of epihalohydrin, one or more compounds having an average of more than one group reactive with a vicinal epoxide group and one or more solvents is from about 10 to about 40 percent by weight based upon the combined weight of the components in the mixture, (1);
   (d) the concentration of solvent(s) in the mixture, (1), of epihalohydrin, one or more compounds having an average of more than one group reactive with a vicinal epoxide group and one or more solvents is from about 10 to about 50 percent by weight based upon the combined weight of the mixture, (1);
   (e) mixture (2) is an organic or aqueous solution of an alkali or alkaline earth metal hydroxide and the concentration of alkali metal or alkaline earth metal hydroxide in the water or organic solvent is from about 35 to about 55 percent by weight based upon the combined weight of the components in the mixture, (2);

(f) mixture (2) is added in an amount which provides a ratio of moles of alkali metal hydroxide or manganese hydroxide per mole of compound having an average of more than one group reactive with an epoxide group of from about 0.75:1 to about 1.25:1;

(g) mixtures (1) and (2) are added concurrently and continuously to mixture (3);

(h) the addition of mixture (1) is completed prior to completion of the addition of mixture (2);

(i) the mixture (3) additionally contains one or more compounds having an average of more than one group reactive with a vicinal epoxide group in an amount up to about 10 percent by weight of the total amount of compounds having an average of more than one group reactive with a vicinal epoxide group to be employed in the reaction;

(h) the addition time of mixture (2) is from about 2 to about 15 hours at a temperature of from about 40° C. to about 70° C.; and (j) wherein the reaction is continued until the reaction mixture contains not greater than about 1 percent by weight of the compounds containing an average of more than one group reactive with a vicinal epoxide group.

4. The process of claim 1 wherein
the concentration of the initial mixture, (3), of epihalohydrin and solvent is from about 60 to about 80 percent by weight epihalohydrin based upon the combined weight of epihalohydrin and solvent;

(b) the concentration of epihalohydrin in the mixture, (1), of epihalohydrin, one or more compounds having an average of more than one group reactive with a vicinal epoxide group and one or more solvents is from about 50 to about 80 percent by weight based upon the combined weight of the components in the mixture, (1);

(c) the concentration of compound(s) having an average of more than one group reactive with a vicinal epoxide group in the mixture, (1), of epihalohydrin, one or more compounds having an average of more than one group reactive with a vicinal epoxide group and one or more solvents is from about 10 to about 30 percent by weight based upon the combined weight of the components in the mixture, (1);

(d) the concentration of solvent(s) in the mixture, (1), of epihalohydrin, one or more compounds having an average of more than one group reactive with a vicinal epoxide group and one or more solvents is from about 10 to about 40 percent by weight based upon the combined weight of the components in the mixture, (1);

(e) mixture (2) is an organic or aqueous solution of an alkali or alkaline earth metal hydroxide and the concentration of alkali metal or alkaline earth metal hydroxide in the water or organic solvent is from about 40 to about 50 percent by weight based upon the combined weight of the components in the mixture, (2);

(f) mixture (2) is added in an amount which provides a ratio of moles of alkali metal hydroxide or manganese hydroxide per mole of compound having an average of more than one group reactive with an epoxide group of from about 0.9:1 to about 1.05:1;

(g) mixtures (1) and (2) are added concurrently and continuously to mixture (3);

(h) the addition of mixture (1) is completed prior to completion of the addition of mixture (2);

(i) the addition time of mixture (2) is from about 3 to about 10 hours at a temperature of from about 45° C. to about 60° C.;

(j) the mixture (3) additionally contains one or more compounds having an average of more than one group reactive with a vicinal epoxide group in an amount of from about 1 to about 5 percent by weight of the total amount of compounds having an average of more than one group reactive with a vicinal epoxide group to be employed in the reaction prior to the simultaneous addition of mixtures (1) and (2) to mixture (3); and (k) wherein the reaction is continued until the reaction mixture contains not greater than about 0.5 percent by weight of the compounds containing an average of more than one group reactive with a vicinal epoxide group.

5. In a process for preparing epoxy resins by reacting an epihalohydrin with one or more compounds having an average of more than one group reactive with a vicinal epoxide group per molecule in the presence of one or more solvents which codistil with water and epihalohydrin and an alkali or alkaline earth metal hydroxide or manganese hydroxide, continuously removing water from the reaction mixture as a codistillate with epihalohydrin and solvent at a rate such that the concentration of water in the reaction mixture is less than about 6% by weight, conducting the reaction at a temperature of from about 20° C. to about 100° C. under a reduced pressure sufficient to provide a codistillate containing water, epihalohydrin and solvent, separating the water from the codistillate and returning the solvent and epihalohydrin to the reaction mixture; the improvement which comprises adding, either concurrently and continuously or concurrently and intermittently, (1) a mixture of (a) epihalohydrin, (b) one or more compounds having an average of more than one group reactive with a vicinal epoxide group and (c) one or more solvents; and (2) a mixture of (d) one or more alkali or alkaline earth metal hydroxides or manganese hydroxide and (e) water or an organic solvent; to (3) a mixture containing (f) epihalohydrin and (g) one or more solvents.

6. The process of claim 5 wherein
(a) the concentration of the initial mixture (3) of epihalohydrin and solvent is from about 20 to about 95 percent by weight epihalohydrin based upon the combined weight of epihalohydrin and solvent;

(b) the concentration of epihalohydrin in the mixture, (1), of epihalohydrin, one or more compounds having an average of more than one group reactive with a vicinal epoxide group and one or more solvents is from about 20 to about 90 percent by weight based upon the combined weight of the components in the mixture (1);

(c) the concentration of compound(s) having an average of more than one group reactive with a vicinal epoxide group in the mixture, (1), of epihalohydrin, one or more compounds having an average of more than one group reactive with a vicinal epoxide group and one or more solvents is from about 5 to about 75 percent by weight based upon the combined weight of the components in the mixture, (1);

(d) the concentration of solvent(s) in the mixture, (1), of epihalohydrin, one or more compounds having an average of more than one group reactive with a vicinal epoxide group and one or more solvents is from about 5 to about 80 percent by weight based upon the combined weight of the components in the mixture, (1);

(e) mixture (2) is an organic or aqueous solution of an alkali or alkaline earth metal hydroxide and the metal hydroxide in the water or organic solvent is from about 30 to about 60 percent by weight based upon the combined weight of the components in the mixture, (2);

(f) mixtures (1) and (2) are added concurrently and continuously to mixture (3);

(g) the addition of mixture (1) is completed prior to completion of the addition of mixture (2);

(h) the addition time of mixture (2) is from about 1 to about 20 hours at a temperature of from about 35° C. to about 80° C.; and (i) the mixture (3) additionally contains one or more compounds having an average of more than one group reactive with a vicinal epoxide group in an amount up to about 15 equivalent percent of the total amount of compounds having an average of more than one group reactive with a vicinal epoxide group to be employed in the reaction prior to the simultaneous addition of mixtures (1) and (2) to mixture (3).

7. The process of claim 5 wherein
(a) the concentration of the initial mixture, (3), of epihalohydrin and solvent is from about 50 to about 90 percent by weight epihalohydrin based upon the combined weight of epihalohydrin and solvent;
(b) the concentration of epihalohydrin in the mixture, (1), of epihalohydrin, one or more compounds having an average of more than one group reactive with a vicinal epoxide group and one or more solvents is from about 40 to about 90 percent by weight based upon the combined weight of the components in the mixture;
(c) the concentration of compound(s) having an average of more than one group reactive with a vicinal epoxide group in the mixture, (1), of epihalohydrin, one or more compounds having an average of more than one group reactive with a vicinal epoxide group and one or more solvents is from about 10 to about 40 percent by weight based upon the combined weight of the components in the mixture, (1);
(d) the concentration of solvent(s) in the mixture, (1), of epihalohydrin, one or more compounds having an average of more than one group reactive with a vicinal epoxide group and one or more solvents is from about 10 to about 50 percent by weight based upon the combined weight of the mixture, (1);
(e) mixture (2) is an organic or aqueous solution of an alkali or alkaline earth metal hydroxide and the concentration of alkali metal or alkaline earth metal hydroxide in the water or organic solvent is from about 35 to about 55 percent by weight based upon the combined weight of the components in the mixture, (2);
(f) mixture (2) is added in an amount which provides a ratio of moles of alkali metal hydroxide or manganese hydroxide per mole of compound having an average of more than one group reactive with an epoxide group of from about 0.8:1 to about 1.25:1;
(g) mixtures (1) and (2) are added concurrently and continuously to mixture (3);
(h) the addition of mixture (1) is completed prior to completion of the addition of mixture (2);
(i) the addition time of mixture (2) is from about 2 to about 15 hours at a temperature of from about 40° C. to about 70° C.;
(j) the mixture (3) additionally contains one or more compounds having an average of more than one group reactive with a vicinal epoxide group in an amount up to about 10 equivalent percent of the total amount of compounds having an average of more than one group reactive with a vicinal epoxide group to be employed in the reaction prior to the simultaneous addition of mixtures (1) and (2) to mixture (3); and
(k) wherein the reaction is continued until the reaction mixture contains not greater than about 0.5 percent by weight of the compounds containing an average of more than one group reactive with a vicinal epoxide group.

8. The process of claim 5 wherein
(a) the concentration of the initial mixture, (3), of epihalohydrin and solvent is from about 60 to about 80 percent by weight epihalohydrin based upon the combined weight of epihalohydrin and solvent;
(b) the concentration of epihalohydrin in the mixture, (1), of epihalohydrin, one or more compounds having an average of more than one group reactive with a vicinal epoxide group and one or more solvents is from about 50 to about 80 percent by weight based upon the combined weight of the components in the mixture, (1);
(c) the concentration of compound(s) having an average of more than one group reactive with a vicinal epoxide group in the mixture, (1), of epihalohydrin, one or more compounds having an average of more than one group reactive with a vicinal epoxide group and one or more solvents is from about 10 to about 30 percent by weight based upon the combined weight of the components in the mixture, (1);
(d) the concentration of solvent(s) in the mixture, (1), of epihalohydrin, one or more compounds having an average of more than one group reactive with a vicinal epoxide group and one or more solvents is from about 10 to about 40 percent by weight based upon the combined weight of the components in the mixture, (1);
(e) mixture (2) is an organic or aqueous solution of an alkali or alkaline earth metal hydroxide and the concentration of alkali metal or alkaline earth metal hydroxide in the water or organic solvent is from about 40 to about 50 percent by weight based upon the combined weight of the components in the mixture, (2);
(f) mixture (2) is added in an amount which provides a ratio of moles of alkali metal hydroxide or manganese hydroxide per mole of compound having an average of more than one group reactive with an epoxide group of from about 0.9:1 to about 1.05:1;

(g) mixtures (1) and (2) are added concurrently and continuously to mixture (3);
(h) the addition of mixture (1) is completed prior to completion of the addition of mixture (2);
(i) the addition time of mixture (2) is from about 3 to about 10 hours at a temperature of from about 45° C. to about 60° C.;
(j) the mixture (3) additionally contains one or more compounds having an average of more than one group reactive with a vicinal epoxide group in an amount of from about 1 to about 5 equivalent percent of the total amount of compounds having an average of more than one group reactive with a vicinal epoxide group to be employed in the reaction prior to the simultaneous addition of mixtures (1) and (2) to mixture (3); and (k) wherein the reaction is continued until the reaction mixture contains not greater than about 0.2 percent by weight of the compounds containing an average of more than one group reactive with a vicinal epoxide group.

9. The process of claim 1, 2, 3, 4, 5, 6, 7 or 8 wherein
(a) said epihalohydrin is a compound represented by the following formula I

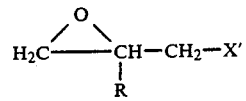

Formula I wherein R is hydrogen or a hydrocarbyl group containing from 1 to about 4 carbon atoms and X' is a halogen;

(b) said one or more compounds containing an average of one or more groups reactive with a vicinal epoxide are compounds represented by the following formulas II, III, IV, V, VI or VII

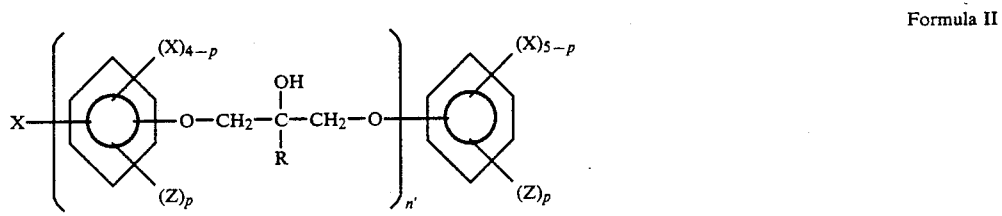

Formula II

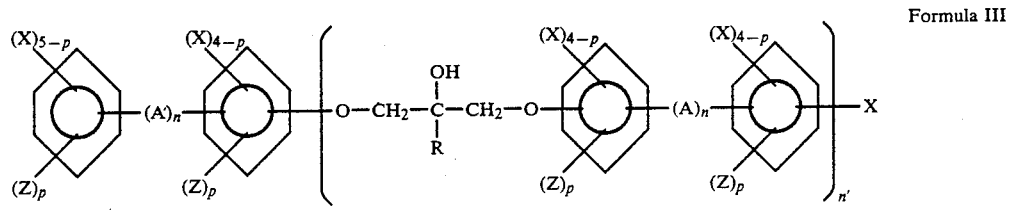

Formula III

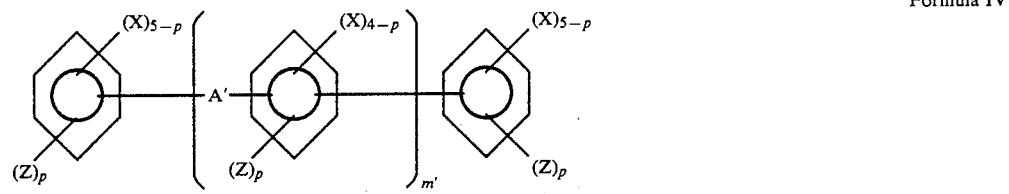

Formula IV

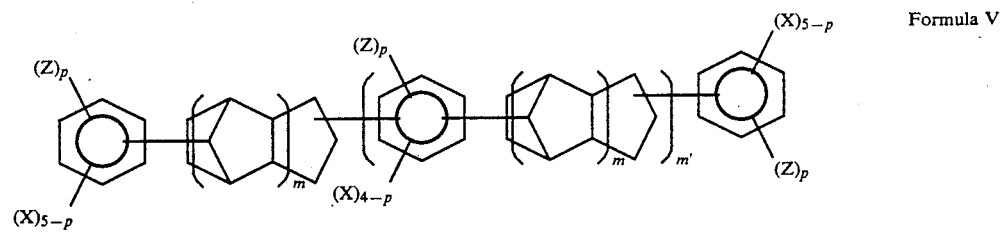

Formula V

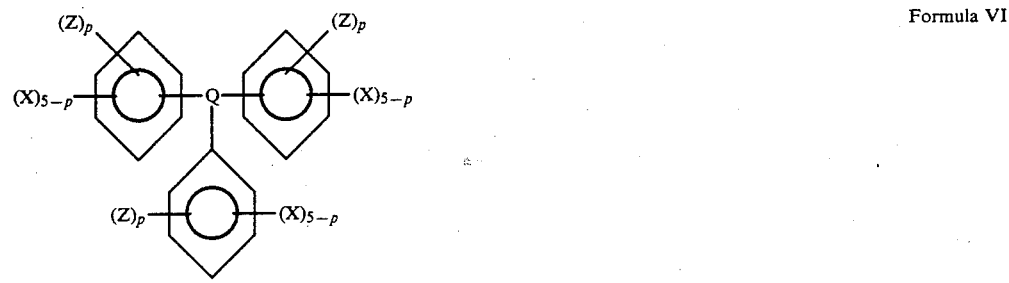

Formula VI

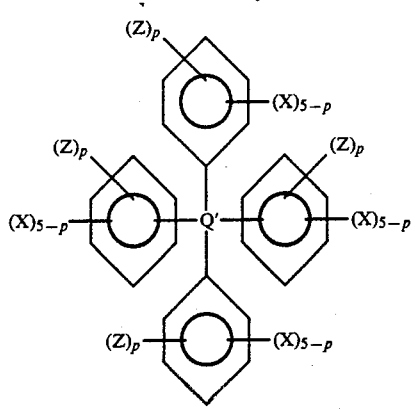

Formula VII wherein each A is independently a divalent hydrocarbon group having from 1 to about 20 carbon atoms, -S-, -S-S-, -O-, -SO-, -SO$_2$-, or -CO-; each A' is independently a divalent hydrocarbyl group having from 1 to about 20 carbon atoms; Q is a trivalent aliphatic, cycloaliphatic, or aromatic hydrocarbon group having from 1 to about 12 carbon atoms; Q' is a tetravalent aliphatic, cycloaliphatic, or aromatic hydrocarbon group having from 1 to about 12 carbon atoms; each R is independently hydrogen or an alkyl group having from 1 to about 4 carbon atoms; each X is independently hydrogen, a hydrocarbyl or hydrocarbyloxy group having from 1 to about 12 carbon atoms or a halogen atom; each Z is independently a hydroxyl, amino or carboxyl group; m has an average value from about 1 to about 20; each m' has an average value from about 1 to about 20; n has a value of zero or 1; n' has an average value from zero to about 15 and p has a value of 1 or 2;

(c) said alkali metal or alkaline earth metal hydroxide is sodium hydroxide, potassium hydroxide, lithium hydroxide, barium hydroxide, calcium hydroxide, magnesium hydroxide, or any combination thereof and is employed as an aqueous solution;

(d) the solvent employed in mixture (1) is 1-methoxy-2-hydroxy propane, cyclohexanol, dioxane, 1,2-diethoxyethane, 2-methoxyethyl ether, tertiary amyl alcohol, methyl ethyl ketone, methyl isobutyl ketone, isoamyl acetate, isobutyl acetate, toluene, dimethyl sulfoxide, dimethylacetamide, dimethylformamide, or any combination thereof; and (e) the solvent employed in the initial mixture (3) is 1-methoxy-2-hydroxy propane, cyclohexanol, dioxane, 1,2-diethoxyethane, 2-methoxyethyl ether, tertiary amyl alcohol, methyl ethyl ketone, methyl isobutyl ketone, isoamyl acetate, isobutyl acetate, toluene, dimethyl sulfoxide, dimethylacetamide, dimethylformamide, or any combination thereof.

10. The process of claim 9 wherein (a) said epihalohydrin is epichlorohydrin, epibromohydrin, epiiodohydrin, methylepichlorohydrin, methylepibromohydrin, methylepiiodohydrin, or any combination thereof;

(b) said compound containing an average of more than one group reactive with a vicinal epoxide group per molecule is a compound or mixture of compounds represented by formulas III, IV, V or VI wherein each A is independently a divalent hydrocarbon group having from 1 to about 12 carbon atoms; each A' is independently a divalent hydrocarbon group having from 1 to about 12 carbon atoms; each R is hydrogen;, m has an average value from about 1 to about 3; m' has an average value from zero to about 10; and n' has an average value from zero to about 10;

(c) said alkali or alkaline earth metal hydroxide is sodium hydroxide, potassium hydroxide, lithium hydroxide, barium hydroxide calcium hydroxide or any combination thereof;

(d) the solvent employed in mixture (1) is 1-methoxy-2-hydroxy propane, cyclohexanol, dioxane, 1,2-diethoxyethane, 2-methoxyethyl ether, tertiary amyl alcohol, dimethyl sulfoxide, dimethylacetamide, or any combination thereof; and (e) the solvent employed in the initial mixture (3) is 1-methoxy-2-hydroxy propane, cyclohexanol, dioxane, 1,2-diethoxyethane, 2-methoxyethyl ether, tertiary amyl alcohol, dimethyl sulfoxide, dimethylacetamide, or any combination thereof.

11. The process of claim 10 wherein (a) said epihalohydrin is epichlorohydrin, epibromohydrin, epiiodohydrin or any combination thereof;

(b) said compound containing an average of more than one group reactive with a vicinal epoxide group per molecule is bisphenol A, bisphenol F, bisphenol K, bisphenol S, tris-(phenol)-methine, 2,2',6,6'-tetramethyl-3,3',5,5'-tetrabromobiphenol, 2,2',6,6'-tetramethyl-3,3',5-tribromobiphenol, phenolformaldehyde novolac resin, cresol-formaldehyde novolac resin, dicyclopentadiene phenol resin, dicyclopentadiene cresol resin, or any combination thereof; and (c) said alkali or alkaline earth metal hydroxide is sodium hydroxide, potassium hydroxide, lithium hydroxide or any combination thereof.

12. The process of claim 11 wherein (a) said epihalohydrin is epichlorohydrin (b) said compound containing an average of more than one group reactive with a vicinal epoxide group per molecule is bisphenol A, tris-(phenol)-methine, 2,2',6,6'-tetramethyl-3,3',5,5'-tetrabromobiphenol, 2,2',6,6'-tetramethyl-3,3',5-tribromobiphenol, phenol-formaldehyde novolac resin, cresol-formaldehyde novolac resin, or any combination thereof;

(c) said alkali or alkaline earth metal hydroxide is sodium hydroxide;

(d) the solvent employed in mixture (1) is 1-methoxy-2-hydroxypropane, tertiary amyl alcohol, dimethylsulfoxide, or any combination thereof; and (e) the solvent employed in the initial mixture (3) is 1-methoxy-2-hydroxypropane, tertiary amyl alcohol, dimethylsulfoxide, or any combination thereof.

* * * * *

UNITED STATES PATENT AND TRADEMARK OFFICE
CERTIFICATE OF CORRECTION

PATENT NO. : 5,028,686

DATED : July 2, 1991

INVENTOR(S) : Zeng-Kun Liao and Chun S. Wang

It is certified that error appears in the above-identified patent and that said Letters Patent is hereby corrected as shown below:

Col. 13, line 32, change the colon to a semicolon.

Col. 13, line 34, change the colon to a semicolon.

Col. 13, line 41, change the colon to a semicolon.

Col. 17, lines 6-7, change "and the metal hydroxide in the water" to read --and the concentration of alkali metal or alkaline earth metal hydroxide in the water--.

Signed and Sealed this

Sixth Day of April, 1993

Attest:

STEPHEN G. KUNIN

Attesting Officer

Acting Commissioner of Patents and Trademarks